United States Patent
Ye

(10) Patent No.: US 11,100,722 B2
(45) Date of Patent: Aug. 24, 2021

(54) METHOD, APPARATUS, ELECTRONIC DEVICE, AND STORAGE MEDIUM FOR DISPLAYING 3D SHAPE IN EXPANDED MANNER

(71) Applicants: GUANGZHOU SHIYUAN ELECTRONICS CO., LTD., Guangdong (CN); GUANGZHOU SHIRUI ELECTRONICS CO. LTD., Guangdong (CN)

(72) Inventor: Hong Ye, Guangzhou (CN)

(73) Assignees: GUANGZHOU SHIYUAN ELECTRONICS CO., LTD., Guangdong (CN); GUANGZHOU SHIRUI ELECTRONICS CO. LTD., Guangdong (CN)

(*) Notice: Subject to any disclaimer, the term of this patent is extended or adjusted under 35 U.S.C. 154(b) by 0 days.

(21) Appl. No.: 16/635,091

(22) PCT Filed: Dec. 17, 2017

(86) PCT No.: PCT/CN2017/116768
§ 371 (c)(1),
(2) Date: Jan. 29, 2020

(87) PCT Pub. No.: WO2019/037355
PCT Pub. Date: Feb. 28, 2019

(65) Prior Publication Data
US 2021/0097773 A1    Apr. 1, 2021

(30) Foreign Application Priority Data
Aug. 21, 2017   (CN) .......................... 201710719419.6

(51) Int. Cl.
*G06T 15/00*     (2011.01)
*G06T 19/20*     (2011.01)
(Continued)

(52) U.S. Cl.
CPC .............. *G06T 19/20* (2013.01); *G06F 16/54* (2019.01); *G06F 16/5854* (2019.01);
(Continued)

(58) Field of Classification Search
CPC ....... G06T 15/04; G06T 15/506; G06T 15/20; G06T 2210/04; G06T 2215/12
(Continued)

(56) References Cited

U.S. PATENT DOCUMENTS 7,167,189 B2    1/2007  Di Lelle et al.
7,805,463 B2 *  9/2010  Bevan ..................... G06F 16/29
                                                          707/803
(Continued)

FOREIGN PATENT DOCUMENTS

CN          101329759 B     12/2008
CN          201965809 U      9/2011
(Continued)

OTHER PUBLICATIONS

International Application No. PCT/CN2017/116768, International Search Report and Written Opinion dated Feb. 12, 2018, 10 pages.
(Continued)

*Primary Examiner* — Phu K Nguyen
(74) *Attorney, Agent, or Firm* — Zhong Law, LLC

(57) ABSTRACT

Provided are a method, an apparatus, an electronic device, and a storage medium for displaying an expansion of a 3D shape, including: determining a 3D shape to be expanded, and acquiring a target expanded state of the 3D shape; searching a preset multi-level information relationship table for an articulation relationship set corresponding to the target expanded state; determining, according to the articulation relationship set and a preset expansion rule library, a target expansion rule for each target plane surface on the 3D shape; and controlling to expand each target plane surface at
(Continued)

a predetermined a rate based on the each target expansion rule, and displaying the expansion process in real time. The method dynamically displays an expansion process of a 3D shape to a student, such that the student can understands more about the process of transformation from a 3D shape to a selected expanded state, thereby improving user experience of a teaching demonstration function on an electronic device.

12 Claims, 6 Drawing Sheets

(51) Int. Cl.
  *G06F 16/583* (2019.01)
  *G06F 16/54* (2019.01)
  *G09B 23/04* (2006.01)
(52) U.S. Cl.
  CPC .......... *G09B 23/04* (2013.01); *G06T 2200/24* (2013.01); *G06T 2219/2008* (2013.01); *G06T 2219/2016* (2013.01)
(58) Field of Classification Search
  USPC ........................................................ 345/418
  See application file for complete search history.

(56) References Cited

U.S. PATENT DOCUMENTS

| | | | | |
|---|---|---|---|---|
| 9,081,418 | B1* | 7/2015 | Yao | G06F 3/017 |
| 9,383,895 | B1* | 7/2016 | Vinayak | G06F 3/04883 |
| 9,945,660 | B2* | 4/2018 | Holz | G06K 9/00201 |
| 10,592,064 | B2* | 3/2020 | Ames | G06F 3/04815 |
| 10,628,535 | B2* | 4/2020 | Mitchell | G06F 30/13 |
| 10,636,209 | B1* | 4/2020 | Thaller | G06T 19/00 |
| 10,706,615 | B2* | 7/2020 | Ford | G06T 15/04 |

FOREIGN PATENT DOCUMENTS

| | | |
|---|---|---|
| CN | 104299460 B | 6/2017 |
| CN | 104778862 B | 8/2017 |
| CN | 107038735 A | 8/2017 |

OTHER PUBLICATIONS

Shiqiaotou Primary School, "Application of MP-lab in Visual Mathematics Teaching", Mathematics, 2016, pp. 10, China Academic Journal Electronic Publishing House.

Lin Force, "Talking about how to realize the design and application of multimedia courseware assisted teaching", China New Technologies and Products, 2009, pp. 7, China Academic Journal Electronic Publishing House.

* cited by examiner

METHOD, APPARATUS, ELECTRONIC DEVICE, AND STORAGE MEDIUM FOR DISPLAYING 3D SHAPE IN EXPANDED MANNER

CROSS-REFERENCE TO RELATED APPLICATIONS

This application is a national stage of PCT/CN2017/116768 filed Dec. 17, 2017, which claims priority to Chinese application CN 201710719419.6 filed Aug. 21, 2017, the contents of which are hereby incorporated by reference in their entireties.

TECHNICAL FIELD

The present disclosure relates to the field of computer application and, in particular, to a method, an apparatus, an electronic device, and a storage medium for displaying a 3D shape in an expanded manner.

BACKGROUND

The teaching of three-demonstrational (3D) shapes often requires displaying the expanded form of a 3D shape (such as a cube, a cylinder, a cone, etc.) to students. At present, the teaching demonstration software implemented on most electronic devices, in general, can merely display the expanded graph of the 3D shape directly to the students.

The direct presentation of the expanded graphic of the 3D shape is not conductive for students to understand the transformation process of the expanded graphic in depth, therefore affecting the user experience of the functionality of the teaching demonstration.

SUMMARY

Embodiments of the present disclosure provide a method, an apparatus, an electronic device, and a storage medium for displaying an expansion of a 3D shape, solving the problem in the teaching process that an expansion process of the 3D shape cannot be dynamically displayed.

In one aspect, the embodiments of the present disclosure provide a method for displaying the expansion of a 3D. The method includes:

determining a 3D shape to be expanded, and acquiring a target expanded state of the 3D shape;

searching a preset multi-level information relationship table for an articulation relationship set corresponding to the target expanded state;

determining a target expansion rule for each target plane surface on the 3D shape according to the articulation relationship set and a preset expansion rule library;

controlling to expand each target plane surface at a predetermined rate based on the each target expansion rule, and displaying the expansion process in real time.

In another aspect, the embodiments of the present disclosure provide an apparatus for displaying the expansion of a 3D shape including:

a target expansion determination module configured to determine a 3D shape to be expanded, and acquire a target expanded state of the 3D shape;

an articulation relationship determination module configured to search a preset multi-level information relationship table for an articulation relationship set corresponding to the target expanded state;

an expansion rule determination module configured to determine a target expansion rule for each target plane surface on the 3D shape according to the articulation relationship set and a preset expansion rule library;

an image expansion control module configured to control to expand each target plane surface at a predetermined rate based on the each target expansion rule, and to display the expansion process in real time.

In another aspect, the embodiments of the present disclosure provide an electronic device. The electronic device includes: one or more processors; and a storage device to store one or more programs.

The one or more programs, when executed by the one or more processors, cause the one or more processors to implement the method for displaying a 3D shape in an expanded manner provided by the embodiments of the present disclosure.

In another aspect, the embodiments of the present disclosure provide a computer-readable storage medium, which is configured to store computer programs for executing a method for displaying an expansion of a 3D shape provided by the embodiments of the present disclosure when the programs are executed by a processor.

In the above method, apparatus, electronic device, and storage medium, for displaying an expansion of a 3D shape, the method includes: determining the 3D shape to be expanded, and acquiring a target expanded state of the 3D shape first; then, searching a preset multi-level information relationship table for an articulation relationship set corresponding to the target expanded state; determining, according to the articulation relationship set and a preset expansion rule library, a target expansion rule for each target plane surface on the 3D shape; and finally, controlling to expand the each target plane surface at a predetermined rate based on the each target expansion rule and, and displaying the expansion process in real time. The above technical solution can dynamically display a process of the 3D shape being expanded to the target expanded state in real time after the target state of the 3D shape is determined. Therefore, in the 3D shape teaching based on an electronic device including this method, the expansion process can be dynamically displayed to a student, such that the student can learn in depth the process of transformation from a 3D shape to a selected expanded state, thereby improving user experience of the teaching demonstration function of an electronic device.

DETAILED DESCRIPTION

Figure 1:
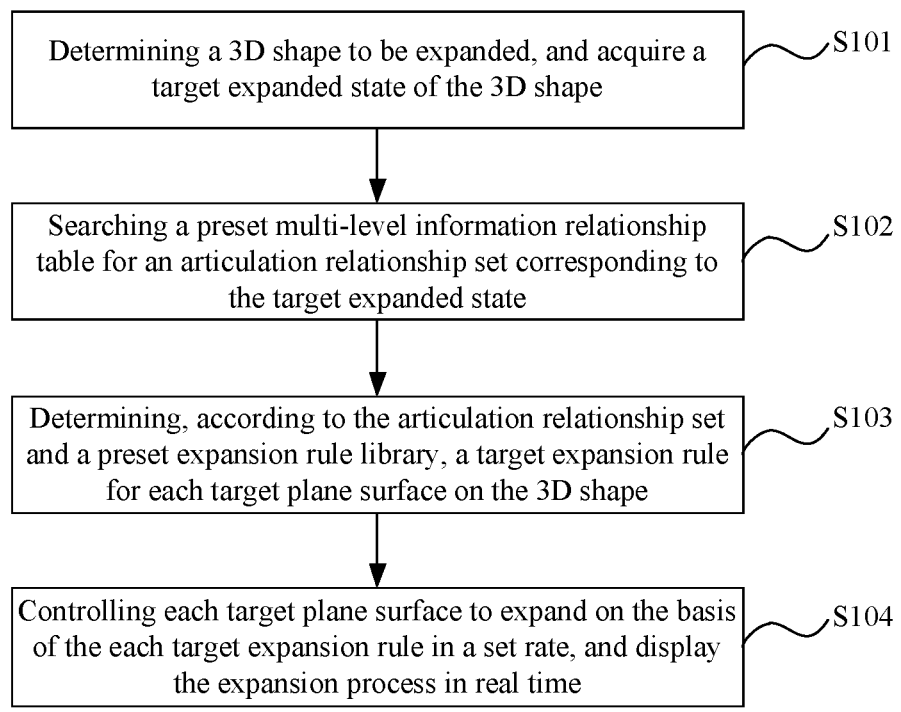
FIG. 1 is a flowchart of a method for displaying the expansion of a 3D shape according to a first embodiment of the present disclosure.

The present disclosure will be further described hereinafter in detail in conjunction with the drawings and embodiments. It is to be understood that the specific embodiments set forth below are intended to illustrate and not to limit the present disclosure. Additionally, it is to be noted that, for the ease of description, merely part, not all, of the structures related to the present disclosure are illustrated in the drawings.

The First Embodiment

FIG. 1 is a flowchart of a method for displaying the expansion of a 3D shape according to a first embodiment of the present disclosure. This method is applicable to demonstrating the expansion of a 3D shape. This method can be executed by an apparatus for displaying the expansion of the 3D shape. The apparatus may be implemented by hardware and/or software and generally integrated, as a plug-in, on an electronic device of a teaching demonstration function.

In this embodiment, the electronic device may specifically be a mobile terminal device such as a mobile phone, a tablet computer, a laptop and the like, and also may be a fixed terminal device having an interactive function such as a desktop computer, a smart teaching whiteboard and the like. The preferred application scenario of this embodiment is that a teacher displays an expansion graphic of 3D shape to a student using an application having a teaching demonstration function on the electronic device. In the meantime, based on the method for displaying the expansion of the 3D shape according to the present disclosure, the student can obtain in-depth understanding of the whole process of expansion from a 3D shape to a plane expanded state, improving the student's understanding of each compositional plane of the 3D shape.

As shown in FIG. 1, the method for displaying an expansion of a 3D shape according to the first embodiment of the present disclosure includes operations described below.

It is to be noted that the following method can be considered to be mainly executed in the process of teaching demonstration based on the teaching demonstration function implemented on the electronic device.

In S101, a 3D shape to be expanded is determined, and a target expanded state of the 3D shape is acquired.

It can be understood that in the process of teaching demonstration, a display interface of the electronic device may include displays of 3D shapes of multiple geometric forms, and each displayed 3D shape can be used as the 3D shape to be expanded. This step can acquire a 3D shape to be expanded selected on the display interface by a user.

It is to be noted that the 3D shape displayed on the electronic device may be a 3D shape directly selected by the user (e.g., a teacher) from standard 3D shapes stored in advance, and may also be a 3D shape actually drawn by the user using a graphic drawing function in the teaching demonstration function.

Generally, the 3D shape commonly can be associated with multiple expanded states. For example, a cube can be associated with 11 different expanded states. In this embodiment, after the 3D shape to be expanded is determined, the target expanded state corresponding to this 3D shape needs to be further determined. This step can also acquire the target expanded state of this 3D shape selected by the user.

In S102, a preset multi-level information relationship table is searched for an articulation relationship set corresponding to the target expanded state.

In this embodiment, the multi-level information relationship table can be specifically understood as a relationship table containing expansion information required by the expansion of the 3D shape. It is to be noted that the multi-level information relationship table may contain multi-level association information of the 3D shape, and for example, the first-level association information in this relationship table includes information of standard 3D shapes of different geometric forms, the corresponding second-level association information includes different expanded state information corresponding to each standard 3D shape, and then the third-level association information may include articulation relationship sets corresponding to each expanded state.

In this embodiment, the articulation relationship set is specifically configured to represent a connection relationship between plane surfaces on the 3D shape after the 3D shape is expanded to an expanded state. In this embodiment, multiple articulation relationship sets may be required to express the connection relationship between plane surfaces when the 3D shape is expanded to an expanded state.

This step can include first searching the multi-level information relationship table built in advance for a standard 3D shape matching a 3D shape to be expanded, then searching all expanded states corresponding to this standard 3D shape for a target expanded state of this 3D shape, and finally determining all articulation relationship sets corresponding to this target expanded state.

In S103, a target expansion rule for each target plane surface on the 3D shape is determined based on the articulation relationship set and a preset expansion rule library.

In this embodiment, the expansion rule library may need to be built in advance. The expansion rule library specifically includes standard expansion rules required by each standard plane surface in the standard 3D shape for executing an expansion operation when the standard 3D shape is expanded to each corresponding expanded state. The standard expansion rule specifically includes a rotation direction and a rotation angle that the corresponding standard plane surface should have. It is to be noted that this embodiment can set the standard expansion rule for each standard plane surface based on the articulation relationship set corresponding to the expanded state.

In this embodiment, plane surfaces of the 3D shape to be expanded are referred to as target plane surfaces, so as to distinguish from plane surfaces of the standard 3D shape. Since a drawing rule for this 3D shape is the same as a drawing rule for the standard 3D shape, it is considered that a matching relationship exists between target plane surfaces on this 3D shape and the standard plane surfaces on the corresponding standard 3D shape.

In this embodiment, before the target expansion rule corresponding to each target plane surface on the 3D shape is determined, a standard plane surface having a matching relationship with the target plane surface needs to be determined, such that the target expansion rule for the target plane surface is determined based on the standard expansion rule corresponding to the standard plane surface.

In S104, each target plane surface is controlled to expand at a predetermined rate based on the each target expansion rule, and the expansion process is displayed in real time.

After the target expansion rule corresponding to each target plane surface on the 3D shape is acquired based on the above step, each target plane surface can be controlled to perform the expansion operation simultaneously on the basis of the respective target expansion rule. In this embodiment, a predetermined expansion rate is preferably configured for the expansion operation, thereby ensuring that each target plane surface starts to expand at the same time and reaches a corresponding expansion position at the same time.

Through this step, the whole expansion process of the target plane surfaces can be displayed in real time on the display interface of the electronic device, thereby implementing dynamitic display of the expansion process of the 3D shape.

The method for displaying a 3D shape in an expanded manner provided by the first embodiment of the present disclosure includes first determining a 3D shape to be expanded, and acquiring a target expanded state of the 3D shape; then, searching a multi-level information relationship table for an articulation relationship set corresponding to the target expanded state; determining, based on the articulation relationship set and a preset expansion rule library, a target expansion rule for each target plane surface on the 3D shape; and finally, controlling each target plane surface to expand at a predetermined rate based on the each target expansion rule and, and displaying the expansion process in real time. The above solution can dynamically display the process of the 3D shape being expanded to the target expanded state after the target expanded state of the 3D shape is determined. Therefore, in the 3D shape teaching based on an electronic device including this method, the expansion process of the 3D shape can be dynamically displayed to a student, such that the student can acquire in-depth understanding of the process of transformation from a 3D shape to a selected expanded state, thereby improving user experience for the teaching demonstration function implemented on an electronic device.

The Second Embodiment

Figure 2A:
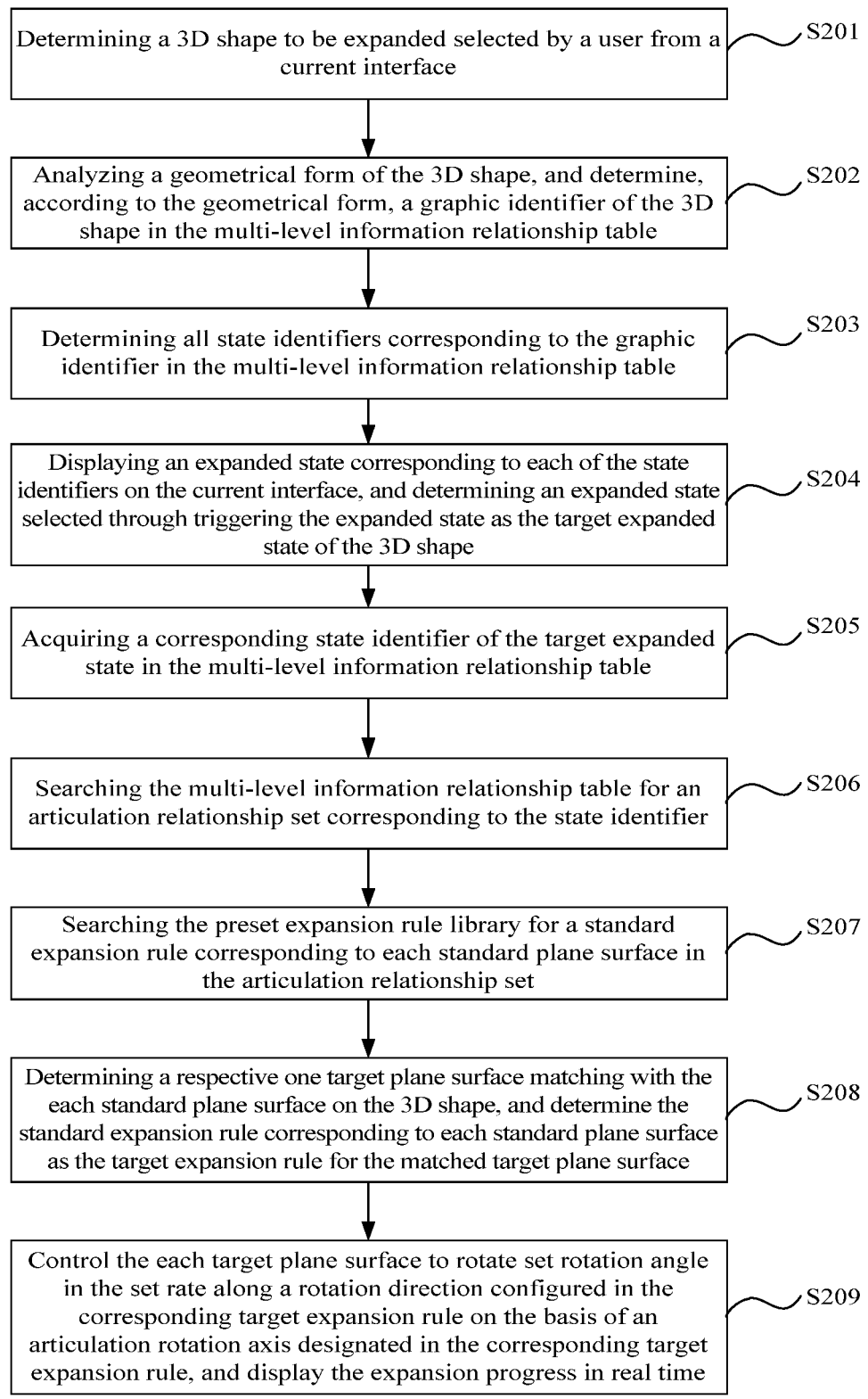
FIG. 2A is a flowchart of a method for displaying the expansion of a 3D shape according to a second embodiment of the present disclosure.

FIG. 2A is a flowchart of a method for displaying an expansion of a 3D according to a second embodiment of the present disclosure. This embodiment is based on optimizing the above embodiment. In this embodiment, the step in which the 3D shape to be expanded is determined and the target expanded state of the 3D shape is acquired is further specifically optimized as follows: determining a 3D shape to be expanded selected by a user from a current interface; analyzing a geometrical form of the 3D shape, and determining, according to the geometrical form, a graphic identifier of the 3D shape in the multi-level information relationship table; determining all state identifiers corresponding to the graphic identifier in the multi-level information relationship table; and displaying a respective expanded state corresponding to each of the state identifiers on the current interface, and determining an expanded state by trigger selecting one of the expanded states as the target expanded state of the 3D shape.

Meanwhile, in this embodiment, the step in which the preset multi-level information relationship table is searched for the articulation relationship set corresponding to the target expanded state is further specifically optimized as follows: acquiring a corresponding state identifier of the target expanded state in the multi-level information relationship table; and searching the multi-level information relationship table for an articulation relationship set corresponding to the state identifier.

Furthermore, in this embodiment, the step in which according to the articulation relationship set and the preset expansion rule library, the target expansion rule for each target plane surface on the 3D shape is determined is specifically optimized as follows: searching the preset expansion rule library for a standard expansion rule corresponding to each standard plane surface in the articulation relationship set; and determining a target plane surface respectively matching the each standard plane surface on the 3D shape, and determining the standard expansion rule corresponding to each standard plane surface as the target expansion rule for the matched target plane surface.

Based on the above optimization, in this embodiment, the step in which each target plane surface is controlled to expand at a predetermined rate based on the each target expansion rule is further optimized as follows: controlling the each target plane surface to rotate a predetermined rotation angle at the predetermined rate along a rotation direction configured in the each target expansion rule based on an articulation rotation axis specified in the each target expansion rule.

As shown in FIG. 2A, the method for displaying an expansion of a 3D shape according to the second embodiment of the present disclosure specifically includes operations described below.

In this embodiment, the following steps are also executed when the 3D shape expansion is demonstrated based on the teaching demonstration function of the electronic device. First, S201 to S204 specifically provide an acquiring process of the target expanded state.

In S201, a 3D shape to be expanded selected by a user from a current interface is determined.

Exemplarily, the current interface may be specifically referred to as a display interface to which the teaching demonstration function of the electronic device is applied. At this time, this step may include determining the selected 3D shape to be expanded according to a selection operation of the user on the current display interface.

The 3D shape can a three-dimensional figure that is formed by one or more surfaces existing in real life. This step can, according to a vertex of the 3D shape, determine a "triangle plane" formed by the vertex, and then combine "triangle planes" in the same plane to form the plane surfaces of the 3D shape according to a "same plane" principle. For convenience of differentiation, the plane surfaces of the 3D shape are referred to as the target plane surfaces in this embodiment.

In S202, a geometrical form of the 3D shape is analyzed, and according to the geometrical form, a graphic identifier of the 3D shape in the multi-level information relationship table is determined.

In this embodiment, the geometrical form can be specifically understood as an actual 3D form combined by plane surfaces formed by points in the three-dimensional space. It can be understood that one geometrical form usually forms one corresponding 3D shape.

It is to be noted that in order to implement the dynamitic expansion of the 3D shape, in this embodiment, information data required by the dynamitic expansion needs to be built in advance, so this embodiment further gives following steps to build the multi-level information relationship table.

Step A, initializing a multi-level information relationship table containing a first-level information column, a second-level information column and a third-level information column.

Specifically, when the multi-level information relationship table is built, a multi-level information relationship table can be first initialized, which is equivalent to building an empty table containing multiple information columns (such as the first-level information column, the second-level information column and the like). Then, useful information can be filled in according to subsequent steps.

Step B, storing a graphic identifier m in the first-level information column of the multi-level information relationship table, where m is an integer greater than 0, and a value of m denotes a standard 3D shape of a geometrical form.

Specifically, in this step, information relating to the 3D shape is specifically filled in the first-level information column of the multi-level information relationship table. It can be understood that the 3D shape may have multiple geometrical forms, and in this embodiment, 3D shape information of all current geometrical forms can be filled into the first-level information column, and graphic identifiers for indicating geometrical forms are specifically filled in the first-level information column.

Exemplarily, 3D shapes of common geometrical forms include cubes, cylinders, cones and the like, where a graphic identifier of the cube can be set to 1, a graphic identifier of the cylinder can be set to 2, a graphic identifier of the cone can be set to 3, and so on. That is, it is equivalent to that a graphic identifier correspondingly denotes a standard 3D shape of a geometrical form. The standard 3D shape is specifically equivalent to a 3D shape drawn based on default parameter values (such as length, height and width of the 3D shape) in a drawing rule.

Figure 2B:
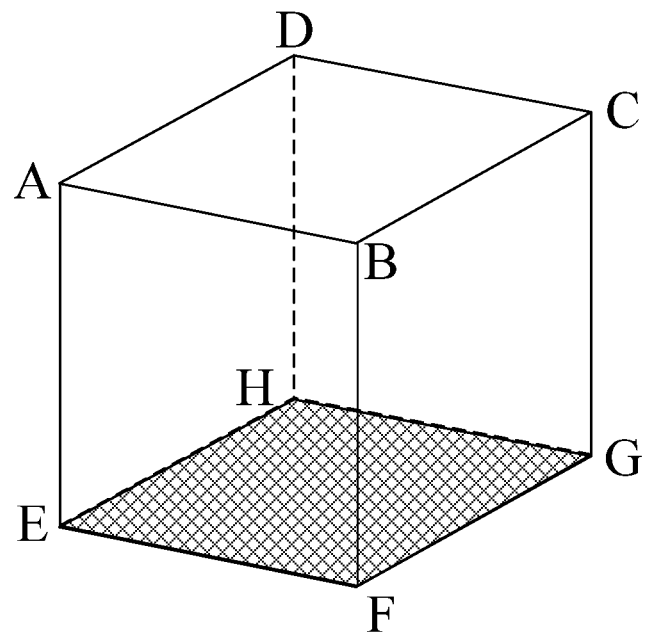
FIG. 2B is a schematic diagram of drawing a standard cube according to the second embodiment of the present disclosure.

It is understood that the graphic identifier symbolically denotes each standard 3D shape, and the standard 3D shape can also be logically denoted according to the vertexes on which the graphics are drawn. FIG. 2B is a schematic diagram of a standard cube according to the second embodiment of the present disclosure. As shown in FIG. 2B, a logical relationship of the standard cube can be denoted using ABCD-EFGH, and a position relationship between each vertex is also determined in advance. For example, the letter A denotes a left front vertex on the top surface of the cube, and other three vertexes on the top surface are denoted respectively by letters B, C and D in the counterclockwise direction.

Step C, storing state identifiers m_n corresponding to the graphic identifier m respectively in the second-level information column of the multi-level information relationship table, where n is an integer greater than 0, and a value of n denotes an expanded state of a standard 3D shape corresponding to the graphic identifier m.

Specifically, in this step, a corresponding relationship exists between information in the second-level information column and graphic identifiers in the first-level information column. For the graphic identifier m, its corresponding standard 3D shape may be associated with multiple expanded states, and state identifiers m_n of each expanded state corresponding to the standard 3D shape are specifically filled in the second-level information column.

Exemplarily, the cube is associated with 11 expanded states. Assuming that the graphic identifier of the standard cube is 1, a corresponding state identifier of the graphic identifier 1 in the second-level information column is denoted as 1_n, where n is any one of integer from 1 to 11, and a value of n denotes an expanded state that the cube is associated with.

Step D, storing articulation relationship sets m_n_q corresponding to the state identifiers m_n respectively in the third-level information column of the multi-level information relationship table, where q is an integer greater than 0, and q denotes the q-th articulation relationship set required when the standard 3D shape corresponding to the graphic identifier m reaches an expanded state of a state identifier n.

In this embodiment of this step, a corresponding relationship exists between information in the third-level information column and state identifiers in the second-level information column. For the expanded state, it is merely denoted by a state identifier as a symbol in the second-level information column that cannot specifically denote a logical relationship of the standard 3D shape in each expanded state. Therefore, articulation relationship sets that can denote corresponding expanded states are specifically filled in the third-level information column, and the articulation relationship set specifically includes a logical relationship when the standard 3D shape is in a corresponding expanded state.

In this embodiment, multiple articulation relationship sets are needed to specifically denote an expanded state of the standard 3D shape. That is, when the standard 3D shape corresponding to the graphic identifier m is in the expanded state of the state identifier n, multiple articulation relationship sets exist correspondingly, where the articulation relationship set m_n_q is equivalent to the q-th articulation relationship set of this expanded state.

The articulation relationship set m_n_q can be specifically denoted as: [standard plane surface $1_q$ articulation rotation axis $1_q$ standard plane surface $2_q$ . . . standard plane surface $k_q$ articulation rotation axis $k_q$ standard plane surface $(k+1)_q$], where the k is an integer greater than 0, the standard plane surface $(k+1)_q$ is a plane surface on the standard 3D shape corresponding to the graphic identifier m, a position and pose state of the plane surface remains unchanged in a process where the expansion reaches the expanded state of the state identifier n, and the articulation rotation axis $k_q$ is a plane intersecting line formed by the standard plane surface $k_q$ and the standard plane surface $(k+1)_q$ in the standard 3D shape corresponding to the graphic identifier m.

In this embodiment, the logical relationship in each articulation relationship set is specifically denoted by vertexes of the corresponding standard 3D shape, and specifically includes standard plane surfaces formed by vertexes and articulation rotation axes formed vertexes.

It is to be noted that standard plane surfaces and articulation rotation axes in each articulation relationship set all need to meet certain conditions. That is, the last standard plane surface in the articulation relationship set needs to be a plane surface that does not rotate when the standard 3D shape reaches the corresponding expanded state, and the articulation rotation axis must be a plane intersecting line of two standard plane surfaces.

Figure 2C:
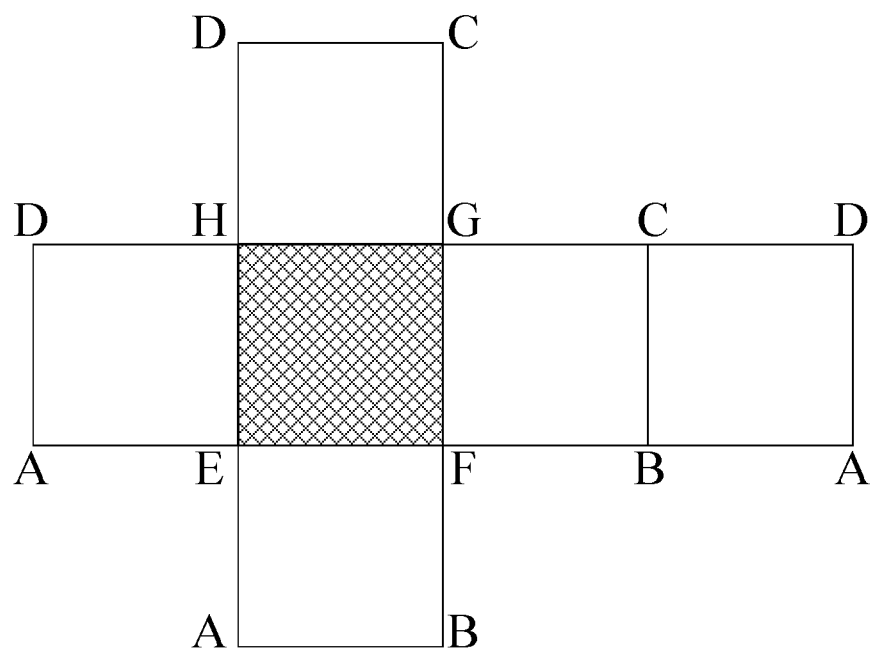
FIG. 2C is a schematic diagram of an expanded state of the standard cube after being expanded.
Figure 2D:
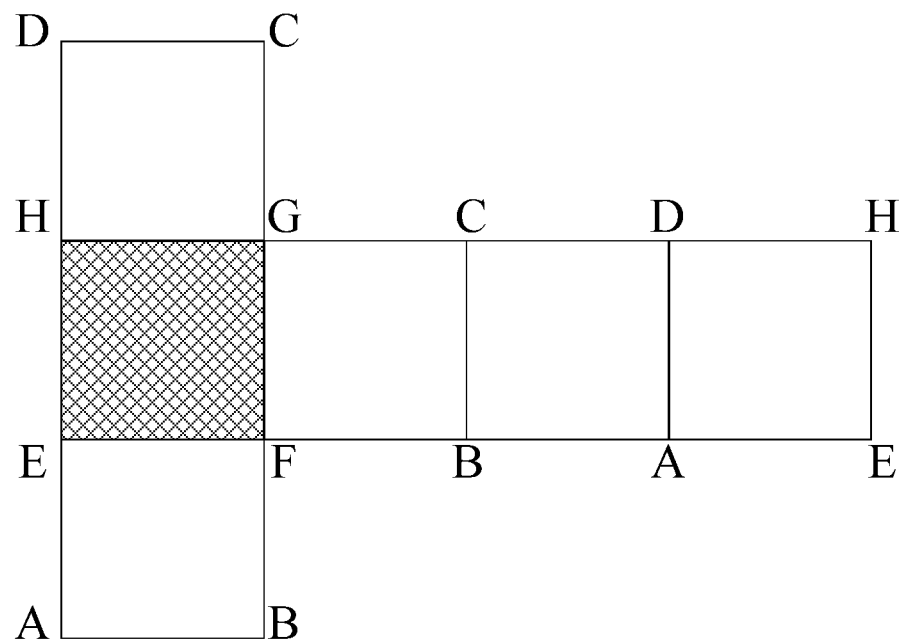
FIG. 2D is a schematic diagram of another expanded state of the standard cube after being expanded.

Exemplarily, FIG. 2C is a schematic diagram of an expanded state of the standard cube after being expanded, and FIG. 2D is a schematic diagram of another expanded state of the standard cube after being expanded. When the standard cube ABCD-EFGH is in the expanded state shown in FIG. 2C, four articulation relationship sets are needed to denote the logical relationship of this expanded state. Assuming that the graphic identifier of the standard cube in the first-level information column is 1 in the multi-level information relationship table, the state identifier of this expanded state in the second-level information column is 1_1, the articulation relationship set 1_1_1 in the third-level information column is specifically denoted as [DABC-BC-CBFG-FG-GFHE], the articulation relationship set 1_1_2 is specifically denoted as [DCGH-GH-HGFE], the articulation relationship set 1_1_3 is specifically denoted as [ADHE-HE-EHGF], and the articulation relationship set 1_1_4 is specifically denoted as [BAEF-EF-FEHG].

As shown in FIG. 2C, when the standard cube is expanded to this expanded state, a position and pose state of the standard plane surface EFGH is not changed, so the standard plane surface EFGH is used as the last standard plane surface in the above four articulation relationship sets (merely the alphabetical order is different), then this plane surface EFGH forms connection relationships with other different standard plane surfaces respectively based on different articulation rotation axes, and finally further illustrates the logical relationship of the expanded state with the above four articulation relationship sets as shown in FIG. 2C.

In addition, when the standard cube ABCD-EFGH is in the expanded state as shown in FIG. 2D, three articulation relationship sets are needed to denote the logical relationship of this expanded state. Assuming that the state identifier of this expanded state in the second-level information column of the multi-level information relationship table is 1_2, the articulation relationship set 1_2_1 in the third-level information column is specifically denoted as [HEAD-AD-DABC-BC-CBFG-FG-GFHE], the articulation relationship set 1_2_2 is specifically denoted as [DCGH-GH-HGFE], and the articulation relationship set 1_2_3 is specifically denoted as [BAEF-EF-FEHG]. Similarly, the above three articulation relationship sets also denote the logical relationship when the standard cube is expanded to the expanded state as shown in FIG. 2D.

S203, determining all state identifiers corresponding to the graphic identifier in the multi-level information relationship table.

This step follows the above S202, and after the graphic identifier of the selected 3D shape in the multi-level information relationship table is determined based on S202, all state identifiers corresponding to this graphic identifier can be determined based in this step. It can be known, from the description of the multi-level information relationship table, a state identifier corresponds to an expanded state that the 3D shape is associated with.

S204, displaying an expanded state corresponding to each of the state identifiers on the current interface, and trigger selecting one of the expanded states as the target expanded state of the 3D shape.

This step can display the expanded state corresponding to each state identifier to the user on the current interface as graphics. Basically, each state identifier is associated with an expanded state graphic by default, and this expanded state graphic can be displayed on a certain area of the current interface, so as to ensure that the user can clearly know which state identifier corresponds to which expanded state.

This step can further set that the user can select any expanded state displayed on the current interface, and determines the expanded state triggered and selected by the user as the target expanded state of the selected 3D shape.

S205, acquiring a state identifier corresponding to the target expanded state in the multi-level information relationship table.

Based on the selected operation corresponding to the above target expanded state, the state identifier of the target expanded state is equivalent to a state identifier corresponding to the expanded state selected by the user on the current interface.

S206, searching the multi-level information relationship table for an articulation relationship set corresponding to the state identifier.

Exemplarily, in this step, all articulation relationship sets corresponding to the above state identifier can be accurately determined in the multi-level information relationship table by searching for a match. The articulation relationship set is equivalent to a representation of a logical relationship of the target expanded state selected by the user.

Based on the articulation relationship set in this step, if the expansion rule for each standard plane surface in the articulation relationship set is clearly known, the expansion operation is performed on the selected 3D shape. Therefore, in this embodiment, the expansion rule needs to be set in advance for each standard plane surface in the articulation relationship set, so as to form an expansion rule library.

Furthermore, this embodiment is optimized when a method and step of building an expansion rule library based on the articulation relationship sets in the multi-level information relationship table is added. This step can be executed at any time after the multi-level information relationship table is built and before S207 is implemented.

Specifically, the step of building an expansion rule library based on the articulation relationship sets in the multi-level information relationship table includes: acquiring each articulation relationship set in the multi-level information relationship table, and determining an expanded state corresponding to the each articulation relationship set; based on the expanded state corresponding to the each articulation relationship set, setting a corresponding standard expansion rule for each standard plane surface in the each articulation relationship set, where the standard expansion rule includes a rotation direction, a set rotation angle and a designated articulation rotation axis that are used for the expansion; and correspondingly storing the articulation relationship set and the standard expansion rule for each standard plane surface in the articulation relationship set to form the expansion rule library.

In this embodiment, when the standard 3D shape is expanded to any selected expanded state, the expansion is specifically realized by rotating each standard plane surface on the standard 3D shape. At the same time, the expanded state is associated with a corresponding articulation relationship set, and the articulation relationship set includes standard plane surfaces of the standard 3D shape. Therefore, the standard 3D shape can be expanded to an expanded state merely through a step of configuring rotation information for each standard plane surface in the articulation relationship set.

In this embodiment, the rotation information configured for each standard plane surface in the articulation relationship set is referred to as the standard expansion rule. The standard expansion rule specifically includes a rotation direction, a set rotation angle and a designated articulation rotation axis that are useful for the expansion. For example, using the expansion of the standard 3D shape to the expanded state shown in FIG. 2D, the rotation information (i.e., the expansion rule) needs to be configured for all standard plane surfaces in the three articulation relationship sets corresponding to this expanded state.

Using the articulation relationship set 1_2_1, [HEAD-AD-DABC-BC-CBFG-FG-GFHE] as an example, this articulation relationship set includes four standard plane surfaces, HEAD, DABC, CBFG and GFHE. The expansion rule corresponding to the standard plane surface HEAD is that specific articulation rotation axes are AD, BC and FG, a rotation direction required for the expansion along AD, BC and FG is the clockwise rotation direction, and the set rotation angle is 90°. The expansion rule corresponding to the standard plane surface DABC is that specific articulation rotation axes are BC and FG, a rotation direction required for the expansion along BC and FG is the clockwise rotation direction, and the set rotation angle is 90°. The expansion rule corresponding to the standard plane surface CBFG is that specific articulation rotation axis is FG, a rotation direction required for the expansion along FG is the clockwise rotation direction, and the set rotation angle is 90°. At the same time, the expansion rule corresponding to the standard plane surface GFHE is no operation.

For the above articulation relationship set, the expansion process of all standard plane surfaces based on the respective expansion rule can be described as follows: controlling the standard plane surface HEAD to simultaneously rotate 90° clockwise along AD, BC and FG respectively, and at the same starting time, controlling the standard plane surface DABC to simultaneously rotate 90° clockwise along BC and FG respectively, and at the same starting time, controlling the standard plane surface CBFG to rotate 90° clockwise along FG, where the rotation rates at which standard plane surfaces HEAD, DABC and CBFG rotate along corresponding articulation rotation axes are the same; and eventually, standard plane surfaces HEAD, DABC and CBFG are on the same plane at the same time.

S207, searching the preset expansion rule library for a standard expansion rule corresponding to each standard plane surface in the articulation relationship set.

This step follows above S206, and after all articulation relationship sets of the target expanded state are determined based on S206, the built expansion rule library can be searched for the standard expansion rule corresponding to each standard plane surface in all articulation relationship sets corresponding to this target expanded state.

S208, determining a target plane surface respectively matching the each standard plane surface on the 3D shape, and determining the standard expansion rule corresponding to each standard plane surface as the target expansion rule for the matched target plane surface.

The standard expansion rule corresponding to each standard plane surface in the articulation relationship set is recorded in the expansion rule library. However, the 3D shape selected in this embodiment is not necessarily a standard 3D shape, and before the 3D shape is expanded, in this embodiment, a matching relationship between each target plane surface on the 3D shape and standard plane surfaces on the standard 3D shape needs to be determined.

Differences of the selected 3D shape selected in this embodiment compared with the corresponding standard 3D shape include differences in sizes of the shapes and differences in letters adopted when the selected 3D shape is logically denoted. However, since the 3D shape and the standard 3D shape are drawn using the same drawing rule, a matching relationship between the 3D shape and the standard 3D shape can be established based on a labeling order and position of each letter on the 3D shape, although letters adopted to denote the 3D shape are different. Exemplarily, the selected cube is denoted as A'B'C'D'-E'F'G'H', where A'B'C'D' matches ABCD on the standard cube.

Therefore, in this embodiment, the matching relationship between each target plane surface on the 3D shape and each standard plane surface on the standard 3D shape can be determined based on the above rule, thereby determining the standard expansion rule corresponding to the matched standard plane surface as the each target expansion rule for each target plane surface.

S209, controlling the each target plane surface to rotate a set rotation angle at the predetermined rate along a rotation direction in the each target expansion rule based on an articulation rotation axis designated in the each target expansion rule, and displaying the expansion progress in real time.

Exemplarily, for the cube A'B'C'D'-E'F'G'H', when the target expanded state corresponds to the state shown in FIG. 2D, each target plane surface can be controlled to rotate at the predetermined rate along the set rotation direction through the specific articulation rotation axis based on the standard expansion rule corresponding to each standard plane surface in the above three articulation relationship sets [HEAD-AD-DABC-BC-CBFG-FG-GFHE], [DCGH-GH-HGFE] and [BAEF-EF-FEHG], and the expansion process is displayed in real time.

In this embodiment, each target plane surface is simultaneously controlled to be dynamically expanded at the same predetermined rate based on the each target expansion rule, and finally, each target plane surface will be on the same plane at the same time, thereby dynamically displaying the process of expansion from the 3D shape to the selected target expanded state.

The method for displaying a 3D shape in an expanded manner provided by the second embodiment of the present disclosure specifies the determination process of the target expanded state, also specifies the determination process of the articulation relationship set and the target expansion rule, and finally, issues the control operation when the 3D shape is expanded to the target expanded state and dynamically displays the expansion process. In addition, this embodiment also specifically provides the method for building the multi-level information relationship table and the expansion rule library. The method can implement the operation of the expansion from the 3D shape to the target expanded state based on the multi-level information relationship table built in advance and the content set in the expansion rule library, and dynamically display, to the student, the whole process of the expansion from the 3D shape to the selected target expanded state, such that the student can obtain in-depth understanding of the expanded state of the 3D shape, thereby improving the user experience of the teaching demonstration function on the electronic device.

Based on the method for displaying a 3D shape in an expanded manner provided by this embodiment, demonstration of the dynamic expansion of 3D shapes of various geometric forms can be implemented based on that information data of the geometric form exists in the multi-level information relationship table, and the expansion rule for the geometric form exists in the expansion rule library.

Figure 2E:
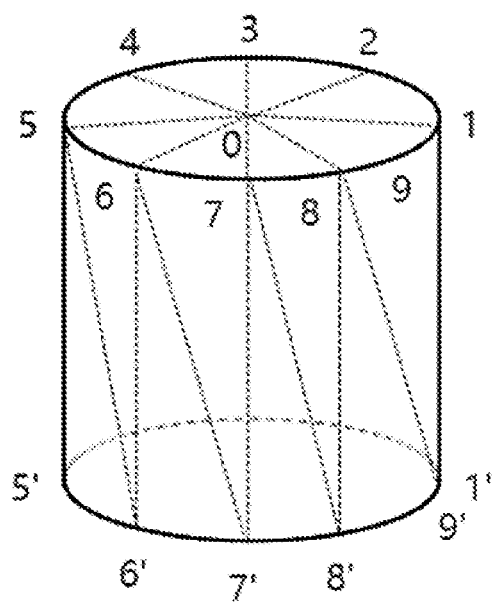
FIG. 2E is a schematic diagram of drawing a standard cylinder according to the second embodiment of the present disclosure.

Using a cylinder as an example, a standard cylinder needs to be drawn first, and vertex identifiers are used for denoting a logical relationship of the cylinder. It can be understood that when the cylinder is drawn, circular surfaces on the top and the bottom of the cylinder are not actual circular arc lines but planes formed by lines linked by vertices. Generally, in order to accurately draw the cylinder, a line linked by 360 vertices can be adopted to form a circular plane, which means that to draw the whole cylinder, 720 vertices are needed. FIG. 2E is a schematic diagram to draw a standard cylinder according to the second embodiment of the present disclosure. In FIG. 2E, ten vertices are shown on each of two circular planes of the cylinder as an example, that is, a vertex for denoting the center of a circle and nine vertexes for denoting the radian of the circular plane.

However, the cylinder is merely associated with one expanded state. Therefore, in the multi-level information relationship table, the cylinder merely corresponds to one expanded state, and merely has an articulation relationship set corresponding to this expanded state. Similarly, the articulation relationship set of this expanded state is also composed of standard plane surfaces and articulation rotation axes (an edge formed by two vertices on the upper circular surface of the cylinder and other two vertices parallel to this edge on the lower circular surface can form a standard plane surface, and the articulation rotation axis is also the plane intersecting line of these two standard plane surfaces).

Similarly, when the cylinder is expanded to its corresponding expanded state, each standard plane surface in the articulation relationship set corresponding to the expanded state also is associated with a corresponding standard expansion rule, and the standard expansion rule corresponding to any standard plane surface includes a specific articulation rotation axis, a rotation direction and a set rotation angle which are used by the expansion. It can be understood that when each standard plane surface of the cylinder is expanded, the corresponding set rotation angle is not necessarily 90°.

Figure 2F:
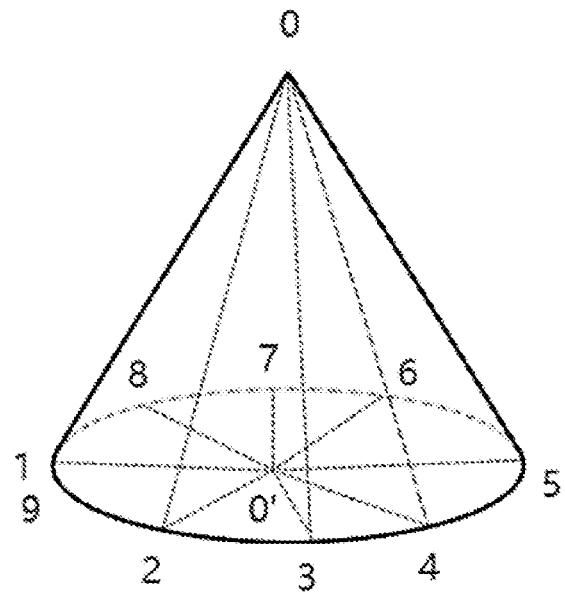
FIG. 2F is a schematic diagram of drawing a standard cone according to the second embodiment of the present disclosure.

In addition, FIG. 2F is a schematic diagram for drawing a standard cone provided by the embodiment 2 of the present disclosure. Shown as an example in FIG. 2F are 11 vertices which denote a bottom surface and a corresponding center of a circle of the cone as well as one vertex denoting a conical point of the cone. A corresponding expanded state and an expansion rule are also required for the dynamitic expansion of this cone. In this embodiment, an expanded state and an articulation relationship set denoting the expanded state are configured for this cone in the multi-level information relationship table, and an expansion rule library is also configured for this cone, which is used for recording an expansion rule for each standard plane surface in the articulation relationship set.

The Third Embodiment

Figure 3:
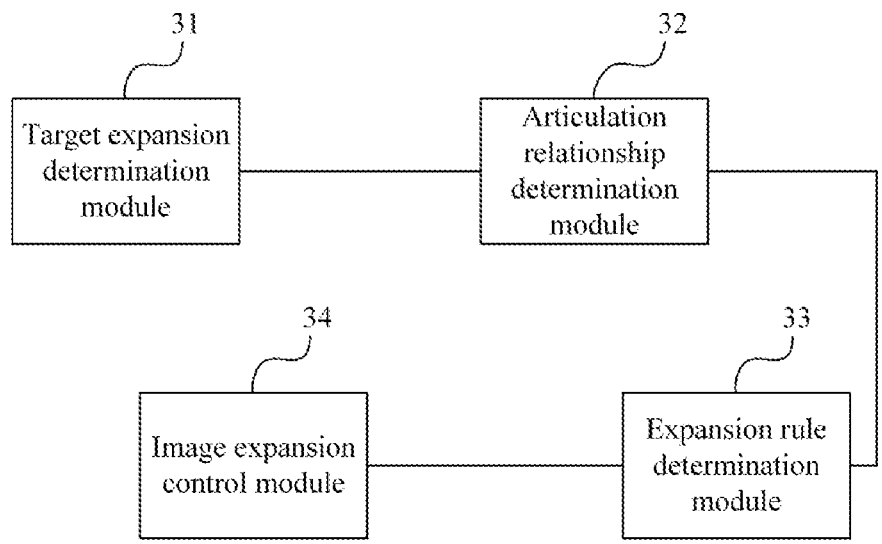
FIG. 3 illustrates an apparatus for displaying an expansion of a 3D shape according to a third embodiment of the present disclosure.

FIG. 3 is a block diagram of an apparatus for displaying an expansion of a 3D shape according to a third embodiment of the present disclosure. This apparatus is applicable to demonstrating of expansion images of a 3D shape. This apparatus can be implemented by hardware and/or software and generally integrated, as a plug-in, on an electronic device with a teaching demonstration function. As shown in FIG. 3, the apparatus includes a target expansion determination module 31, an articulation relationship determination module 32, an expansion rule determination module 33 and an image expansion control module 34.

The target expansion determination module 31 is configured to determine a 3D shape to be expanded, and acquire a target expanded state of the 3D shape.

The articulation relationship determination module 32 is configured to search a preset multi-level information relationship table for an articulation relationship set corresponding to the target expanded state.

The expansion rule determination module 33 is configured to determine a target expansion rule for each target plane surface on the 3D shape according to the articulation relationship set and a preset expansion rule library.

The image expansion control module 34 is configured to control to expand each target plane surface at a predetermined rate based on the each target expansion rule, and display the expansion process in real time.

In this embodiment, this apparatus first determines a 3D shape to be expanded and acquires a target expanded state of the 3D shape through the target expansion determination module 31, then searches a preset multi-level information relationship table for an articulation relationship set corresponding to the target expanded state through the articulation relationship determination module 32, determines, according to the articulation relationship set and a preset expansion rule library, a target expansion rule for each target plane surface on the 3D shape through the expansion rule determination module 33, and finally controls to expand each target plane surface based on the each target expansion rule in a set rate and displays the expansion process in real time through the image expansion control module 34.

The apparatus for displaying a 3D shape in an expanded manner provided by the embodiment 3 of the present disclosure can dynamically display a process of expansion from a 3D shape to a target expansion state in real time after the target state of the 3D shape is determined. Therefore, in the 3D shape teaching based on an electronic device including this method, the expansion process of the 3D shape can be dynamically displayed to a student, such that the student can understands more the process of transformation from a 3D shape to a selected expanded state, thereby improving the user experience of a teaching demonstration function on an electronic device.

Furthermore, the target expansion determination module 31 is specifically configured to:

determine a 3D shape to be expanded selected by a user from a current interface; analyze a geometric form of the 3D shape, and determine, according to the geometrical form, a graphic identifier of the 3D shape in the multi-level information relationship table; determine all state identifiers corresponding to the graphic identifier in the multi-level information relationship table; and display an expanded state corresponding to each of the state identifiers on the current interface, and determine an expanded state selected by triggering the expanded state as the target expanded state of the 3D shape.

Furthermore, the articulation relationship determination module 32 is specifically configured to acquire a corresponding state identifier of the target expanded state in the multi-level information relationship table, and search the multi-level information relationship table for an articulation relationship set corresponding to the state identifier.

Meanwhile, the expansion rule determination module 33 is specifically configured to:

search the preset expansion rule library for a standard expansion rule corresponding to each standard plane surface in the articulation relationship set, and determine a target plane surface respectively matching the each standard plane surface on the 3D shape, and determine the standard expansion rule corresponding to each standard plane surface as the target expansion rule for the matched target plane surface.

In addition, the image expansion control module 34 is specifically configured to:

control the each target plane surface to rotate at set rotation angle at the predetermined rate along a rotation direction configured in the each target expansion rule based on an articulation rotation axis designated in the each target expansion rule, and display the expansion progress in real time.

Based on the above optimization, the apparatus further includes a relationship table building module. The relationship table building module is configured to build the multi-level information relationship table according to following steps.

initializing a multi-level information relationship table containing a first-level information column, a second-level information column and a third-level information column; storing a graphic identifier m in the first-level information column of the multi-level information relationship table, where m is an integer greater than 0, and a value of m denotes a standard 3D shape of a geometrical form; storing state identifiers m_n corresponding to the graphic identifier m respectively in the second-level information column of the multi-level information relationship table, where n is an integer greater than 0, and a value of n denotes an expanded state of a standard 3D shape corresponding to the graphic identifier m; and storing articulation relationship sets m_n_q corresponding to the state identifiers m_n respectively in the third-level information column of the multi-level information relationship table, where q is an integer greater than 0, and q denotes the q-th articulation relationship set required when the standard 3D shape corresponding to the graphic identifier m reaches an expanded state of a state identifier n.

Based on the above optimization, the q-th articulation relationship set m_n_q is specifically denoted as:

[standard plane surface $1_q$_articulation rotation axis $1_q$_standard plane surface $2_q$_ . . . standard plane surface $k_q$_articulation rotation axis $k_q$_standard plane surface $(k+1)_q$], where the k is an integer greater than 0, the standard plane surface $(k+1)_q$ is a plane surface on the standard 3D shape corresponding to the graphic identifier m, a position and pose state of the plane surface remains unchanged in the process where the expansion reaches the expanded state of the state identifier n, and the articulation rotation axis $k_q$ is a plane intersecting line formed by the standard plane surface $k_q$ and the standard plane surface $(k+1)_q$ on the standard 3D shape corresponding to the graphic identifier m.

Furthermore, the apparatus further includes a rule library building module. The rule library building module is configured to build an expansion rule library based on articulation relationship sets in the multi-level information relationship table.

Based on the above optimization, the rule library building module is specifically configured to:

acquire each articulation relationship set in the multi-level information relationship table, and determine an expanded state corresponding to the each articulation relationship set; based on the expanded state corresponding to the each articulation relationship set, designate a corresponding standard expansion rule for each standard plane surface in the each articulation relationship set, where the standard expansion rule includes a rotation direction, a set rotation angle and a designated articulation rotation axis that are required by the expansion; and correspondingly store the articulation relationship set and the standard expansion rule for each standard plane surface in the articulation relationship set to form the expansion rule library.

The Fourth Embodiment

Figure 4:
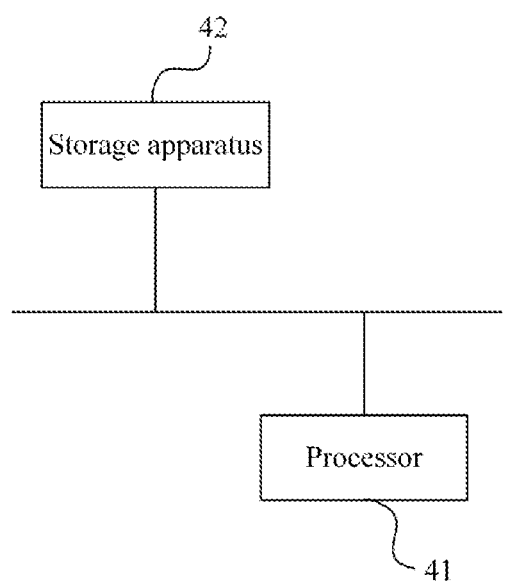
FIG. 4 is a structural diagram of hardware of an electronic device according to a fourth embodiment of the present disclosure.

FIG. 4 is a structural diagram of hardware of an electronic device provided by an embodiment 4 of the present disclosure. As shown in FIG. 4, the electronic device provided by the embodiment 4 includes a processor 41 and a storage apparatus 42.

The number of processors in the electronic device may be one or more, with one processor 41 as an example in FIG. 4. The processor 41 and the storage apparatus 42 in the electronic apparatus may also be connected via a bus or in other manners, with connection via a bus as an example in FIG. 4.

It can be understood that the electronic device in this embodiment can integrate with an interaction function of teaching demonstration for teachers to perform teaching demonstration.

As a computer-readable storage medium, the storage apparatus 42 in the electronic device can be configured to store one or more programs. The programs may be software programs, computer executable programs and modules thereof, such as program instructions/modules corresponding to the method for displaying an expansion of a 3D shape in the embodiments of the present disclosure (e.g., modules in the apparatus for displaying an expansion of a 3D shape shown in FIG. 3, which includes the target expansion determination module 31, the articulation relationship determination module 32, the expansion rule determination module 33 and the image expansion control module 34). The processor 41 runs the software programs, instructions and modules stored in the storage apparatus 42 to execute various function applications and data processing of the electronic device, that is, to implement the method for displaying the expansion of a 3D shape in the above method embodiments.

The storage apparatus 42 may include a program storage area and a data storage area. The program storage area may store an operating system and an application program required by at least one function. The data storage area may store data created depending on use of a device (e.g., preset standard reference information in the above embodiments). In addition, the storage apparatus 42 may include a high-speed random access memory, and may also include a nonvolatile memory, such as at least one click memory, flash memory or another nonvolatile solid-state memory. In some examples, the storage apparatus 42 may further include memories located remotely relative to the processor 41, and these remote memories may be connected to the device via a network. Examples of the above network include, but are not limited to, the Internet, an intranet, a local area network, a mobile communication network and combinations thereof.

When executed by the one or more processors 41, the one or more programs included in the above electronic device execute following operations.

A 3D shape to be expanded is determined, and a target expanded state of the 3D shape is acquired; a preset multi-level information relationship table is searched for an articulation relationship set corresponding to the target expanded state; according to the articulation relationship set and a preset expansion rule library, a target expansion rule for each target plane surface on the 3D shape is determined; and each target plane surface is controlled to expand based on the each target expansion rule at a predetermined rate, and the expansion process is displayed in real time.

In addition, an embodiment of the present disclosure further provides a computer-readable storage medium. The computer-readable storage medium is configured to store computer programs for performing the method for displaying an expansion of a 3D shape according to the first embodiment or the second embodiment of the present disclosure when the programs are executed by a control apparatus. The method includes: determining a 3D shape to be expanded, and acquiring a target expanded state of the 3D shape; searching a preset multi-level information relationship table for an articulation relationship set corresponding to the target expanded state; determining, according to the articulation relationship set and a preset expansion rule library, a target expansion rule for each target plane surface on the 3D shape; and controlling to expand each target plane surface based on the each target expansion rule at a predetermined rate, and displaying the expansion process in real time.

From the above description of embodiments, it will be apparent to those skilled in the art that the present disclosure may be implemented by means of software and necessary general-purpose hardware, or may of course be implemented by hardware, but in many cases the former is a preferred embodiment. Based on this understanding, the technical solutions of the present disclosure substantially, or the part contributing to the related art, may be embodied in the form of a software product. The software product may be stored in a computer readable storage medium, such as a computer floppy disk, a read-merely memory (ROM), a random access memory (RAM), a flash, a hard disk or an optical disk, and includes several instructions for enabling a computer device (which may be a personal computer, a server or a network device) to execute the method according to each embodiment of the present disclosure.

It is to be noted that the above are merely preferred embodiments of the present disclosure and the technical principles used therein. It will be understood by those skilled in the art that the present disclosure is not limited to the specific embodiments described herein. Those skilled in the art can make various apparent modifications, adaptations and substitutions without departing from the scope of the present disclosure. Therefore, while the present disclosure has been described in detail through the above-mentioned embodiments, the present disclosure is not limited to the above-mentioned embodiments and may include more other equivalent embodiments without departing from the concept of the present disclosure. The scope of the present disclosure is determined by the scope of the appended claims.

What is claimed is:

1. A method for displaying an expansion of a three-demonstrational (3D) shape, comprising:
    determining a 3D shape to be expanded, wherein the 3D shape is associated with a plurality of expanded states, and each of the plurality of expanded states is identified by a corresponding state identifier;
    acquiring a target expanded state from the plurality of expanded states of the 3D shape;
    searching a preset multi-level information relationship table for an articulation relationship set corresponding to the target expanded state;
    determining, according to the articulation relationship set and a preset expansion rule library, a target expansion rule for each target plane surface on the 3D shape; and
    controlling to expand the each target plane surface at a predetermined rate based on the each target expansion rule, and displaying the expansion process in real time.

2. The method of claim 1, wherein the determining the 3D shape to be expanded, and acquiring the target expanded state from the plurality of expanded states of the 3D shape comprises:
    determining the 3D shape to be expanded as one selected by a user from a current interface;
    analyzing a geometric form of the 3D shape, and determining, according to the geometric form, a graphic identifier of the 3D shape in the multi-level information relationship table;
    determining all state identifiers corresponding to the graphic identifier in the multi-level information relationship table; and
    displaying a respective expanded state corresponding to each of the state identifiers on the current interface, and determining an expanded state by trigger selecting one of the expanded states as the target expanded state of the 3D shape.

3. The method of claim 1, wherein the searching the preset multi-level information relationship table for the articulation relationship set corresponding to the target expanded state comprises:
    acquiring a corresponding state identifier of the target expanded state in the multi-level information relationship table; and
    searching the multi-level information relationship table for an articulation relationship set corresponding to the state identifier.

4. The method of claim 1, wherein the determining, according to the articulation relationship set and the preset expansion rule library, the target expansion rule for the each target plane surface on the 3D shape comprises:
    searching the preset expansion rule library for a standard expansion rule corresponding to the each standard plane surface in the articulation relationship set; and
    determining a respective one target plane surface matching with the each standard plane surface on the 3D shape, and determining the standard expansion rule corresponding to the each standard plane surface as the target expansion rule for the matched target plane surface.

5. The method of claim 1, wherein the controlling to expand the each target plane surface at a predetermined rate based on the each target expansion rule, and displaying the expansion process in real time comprises:
    controlling the each target plane surface to rotate a set rotation angle at the predetermined rate along a rotation direction in the each target expansion rule based on an articulation rotation axis specified in the each target expansion rule.

6. The method of claim 1, further comprising: building the multi-level information relationship table according to following steps:
    initializing the multi-level information relationship table comprising a first-level information column, a second-level information column, and a third-level information column;
    storing a graphic identifier m in the first-level information column of the multi-level information relationship table, wherein m is an integer greater than 0, and a value of m denotes a standard 3D shape of a geometrical form;
    storing state identifiers m_n corresponding to the graphic identifier m in the second-level information column of the multi-level information relationship table, wherein n is an integer greater than 0, and a value of n denotes an expanded state of a standard 3D shape corresponding to the graphic identifier m; and
    storing articulation relationship sets m_n_q corresponding to the state identifiers m_mn in the third-level information column of the multi-level information relationship table, wherein q is an integer greater than 0, and q denotes a q-th articulation relationship set required when the standard 3D shape corresponding to the graphic identifier m reaches an expanded state of a state identifier n.

7. The method according to claim 6, wherein the q-th articulation relationship set is specifically denoted as:
    [standard plane surface $1_q$_articulation rotation axis $1_g$_standard plane surface $2_g$_ . . . standard plane surface $k_g$_articulation rotation axis $k_g$_standard plane surface $(k+1)_q$], wherein the k is an integer greater than 0, the standard plane surface $(k+1)_q$ is a plane surface on the standard 3D shape corresponding to the graphic identifier m, a position and pose state of the plane surface remains unchanged in a process where the expansion reaches the expanded state of the state identifier n; and wherein the articulation rotation axis $k_q$ is a plane intersecting line formed by the standard plane surface $k_q$ and the standard plane surface $(k+1)_q$ in the standard 3D shape corresponding to the graphic identifier m.

8. The method of claim 1, further comprising: building the expansion rule library based on articulation relationship sets in the multi-level information relationship table.

9. The method of claim 8, wherein the building the expansion rule library based on articulation relationship sets in the multi-level information relationship table comprises:

acquiring each articulation relationship set in the multi-level information relationship table, and determining an expanded state corresponding to the each articulation relationship set;

based on the expanded state corresponding to the each articulation relationship set, designating a corresponding standard expansion rule for each standard plane surface in the each articulation relationship set, wherein the standard expansion rule comprises a rotation direction, a set rotation angle and a designated articulation rotation axis that are used by expansion; and storing the articulation relationship set and the corresponding standard expansion rule for the each standard plane surface in the articulation relationship set to form the expansion rule library.

10. An electronic device, comprising:
one or more processors; and
a storage apparatus, which is configured to store one or more programs;
wherein the one or more programs, when executed by the one or more processors, cause the one or more processors to implement the method for displaying an expansion of a 3D shape of claim 1.

11. A non-transitory computer-readable storage medium, which is configured to store computer programs for performing the method for displaying an expansion of a 3D shape of claim 1 when the programs are executed by a processor.

12. An apparatus for displaying an expansion of a three-demonstrational (3D) shape, comprising:

a target expansion determination module configured to determine a 3D shape to be expanded, wherein the 3D shape is associated with a plurality of expanded states, and each of the plurality of expanded states is identified by a corresponding state identifier, and configured to acquire a target expanded state from the plurality of expanded states of the 3D shape;

an articulation relationship determination module configured to search a preset multi-level information relationship table for an articulation relationship set corresponding to the target expanded state;

an expansion rule determination module configured to determine a target expansion rule for each target plane surface on the 3D shape according to the articulation relationship set and a preset expansion rule library; and an image expansion control module configured to control to expand the each target plane surface at a predetermined rate based on the each target expansion rule and, and display the expansion process in real time.

* * * * *